Patented Aug. 11, 1931

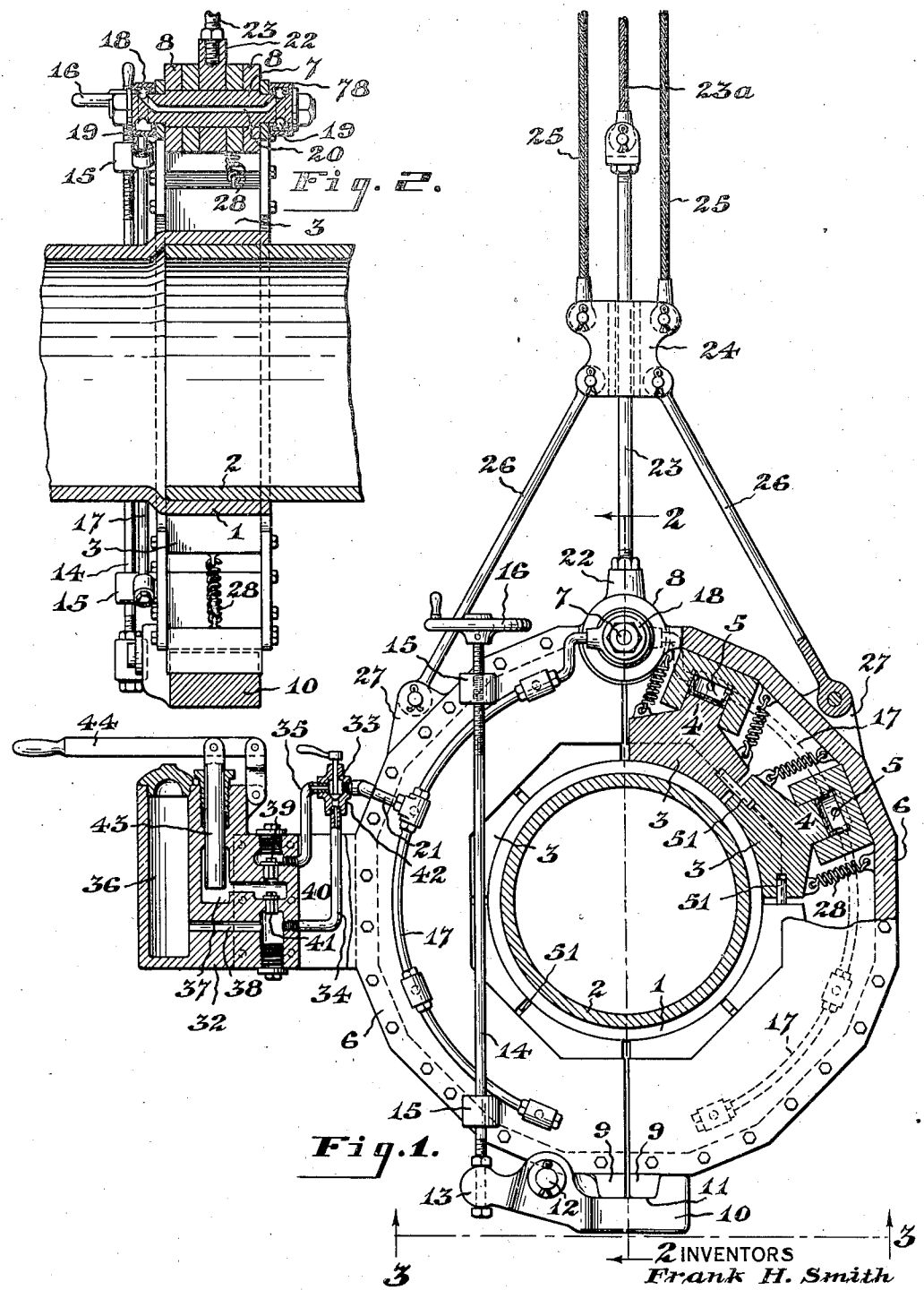

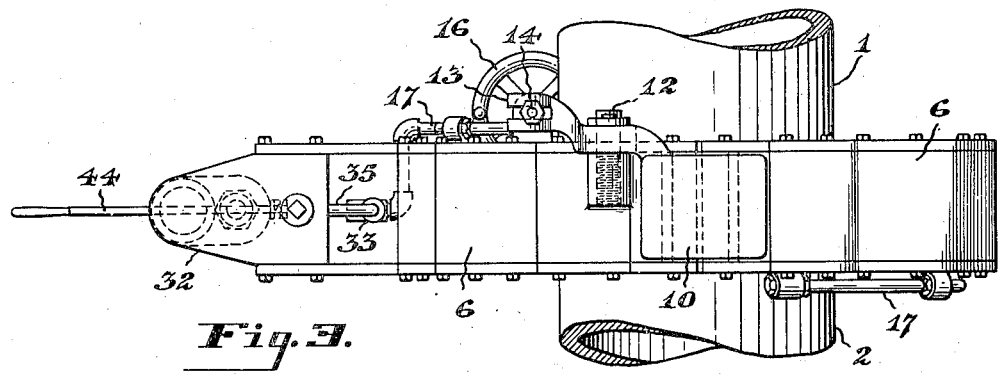
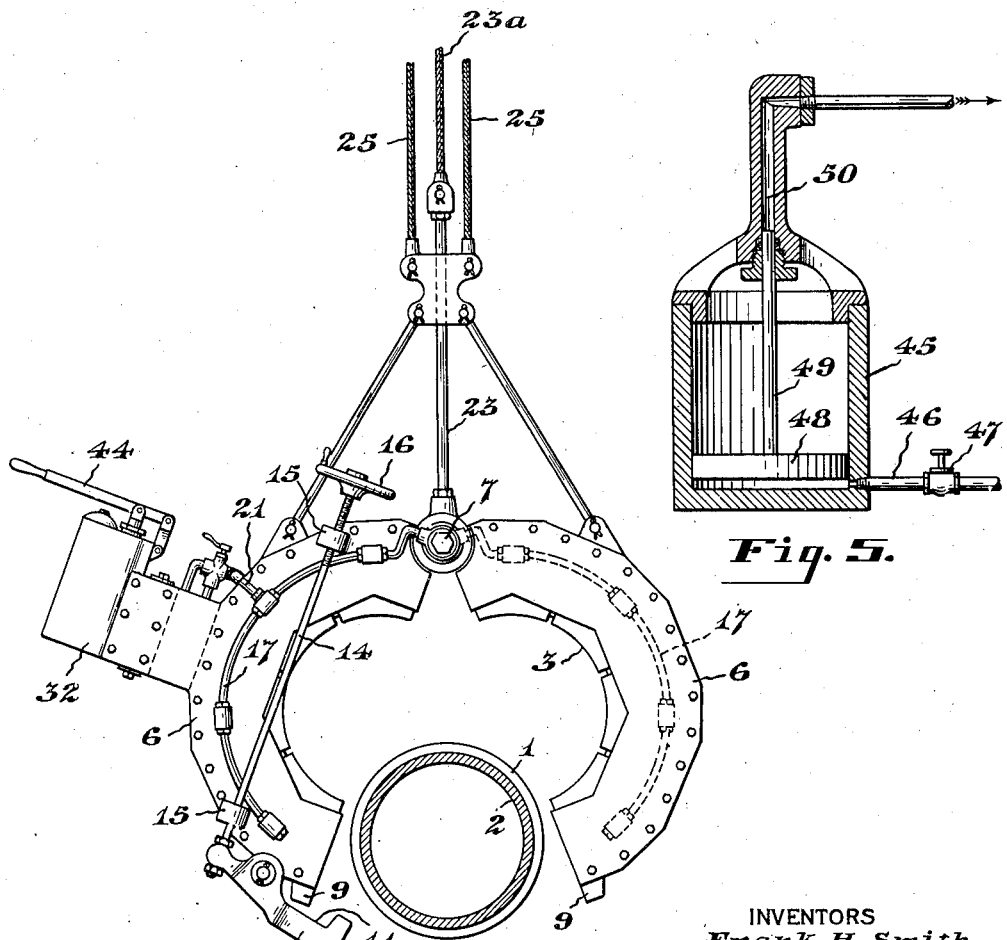

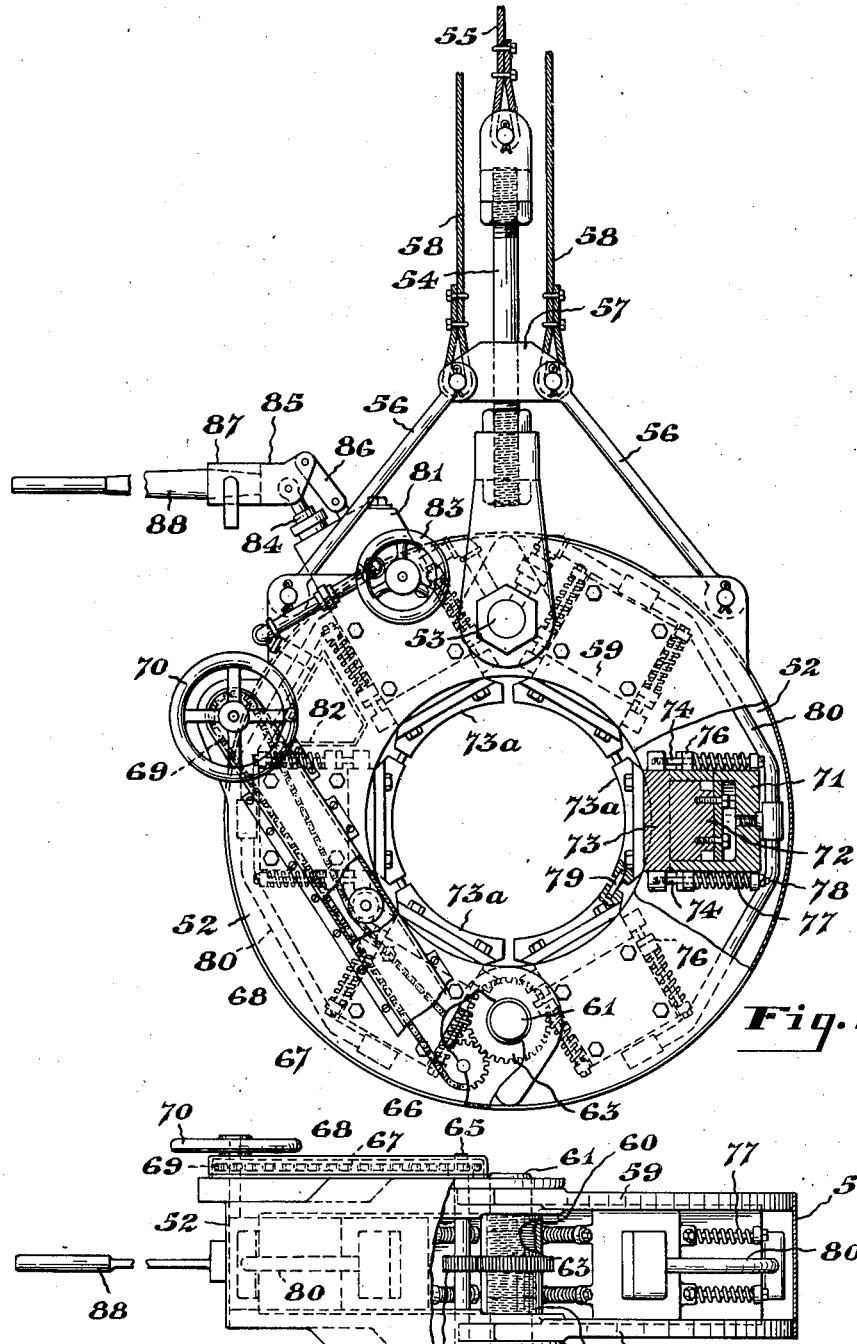

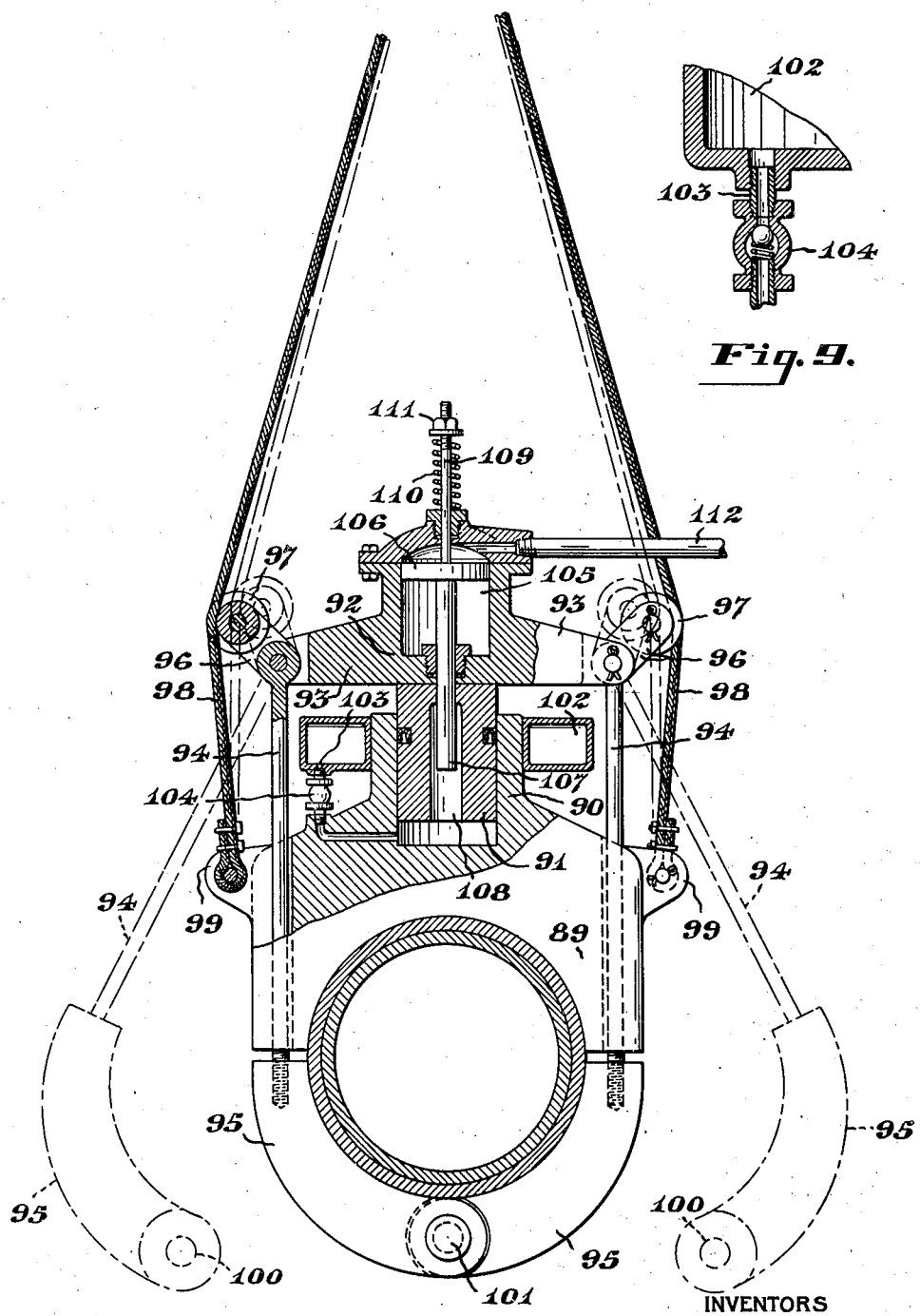

1,818,435

UNITED STATES PATENT OFFICE

FRANK H. SMITH, OF PHILADELPHIA, PENNSYLVANIA, AND HENRY A. STRINGFELLOW, OF AKRON, OHIO

APPARATUS FOR JOINING PIPES

Application filed February 20, 1929. Serial No. 341,333.

The present invention relates to apparatus for joining pipes and has for its object to provide apparatus for mechanically shrinking the end of one pipe onto the end of another by radial pressure applied externally to the outer pipe so that the wall of the outer pipe is stressed beyond its elastic limit and permanently reduced in diameter and whereby the inner pipe has stresses set up therein whereby the inner pipe exerts radial pressure throughout its circumference upon the outer pipe.

A further object is to provide a pipe shrinking device which can be quickly and easily applied to the joint between telescopically connected pipes and which can be quickly and easily removed after the shrinking operation.

A further object is to provide a portable pipe shrinking unit adapted to be placed in a position encircling the pipe and provided with means for applying radial pressure to the pipe, and further to provide the unit with opening, closing and hoisting means so that it can be readily lowered onto a pipe and applied thereto.

A further object is to provide a pipe shrinking unit in the form of a sectional ring carrying a series of circumferentially spaced fluid pressure cylinders provided with plungers through which pressure is applied to the pipe and having means for locking the ring in closed position during the shrinking operation and for applying pressure simultaneously to the cylinders.

A further object is to provide a self-contained portable hydraulic shrinking unit in which the means for supplying hydraulic pressure to the cylinders is carried by the unit.

With the above and other objects in view, the invention may be said to comprise the apparatus shown in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Figure 1 is a side elevation of apparatus embodying the invention, the apparatus being shown applied to a pipe joint and having parts broken away and shown in section.

Fig. 2 is a section taken on the line indicated at 2—2 in Fig. 1.

Fig. 3 is a bottom plan view of the shrinking unit.

Fig. 4 is a side elevation showing the shrinking unit in open position.

Fig. 5 is a detail view of a pneumatic hydraulic intensifier which may be used instead of the pump shown in Fig. 1.

Fig. 6 is a side elevation showing a slightly modified form of the invention.

Fig. 7 is a bottom plan view of the apparatus shown in Fig. 5.

Fig. 8 is a side elevation showing a further modification of the invention.

Fig. 9 is a detail view showing the check valve employed in the apparatus shown in Fig. 7.

The apparatus of the present invention is designed for use in forming permanent joints between sections of pipe which have been fitted together telescopically end to end, the pipes being provided at one end with a bell 1 of an internal diameter such that it will readily receive the spigot 2 of the adjoining pipe. The apparatus of the present invention, as shown in Figs. 1 to 4, comprises a shrinking unit which has a series of circumferentially spaced pressure applying heads 3 which have concave faces engageable with the surface of a bell to be shrunk and which are carried by the inner ends of pistons 4 which are mounted in radially disposed fluid pressure cylinders 5 which are attached to the interior of a sectional ring composed of two substantially identical semi-circular sections 6. The plungers 3 are equally spaced within the supporting ring and are transversely elongated so that the adjacent edges thereof are relatively close together. The end edges of the heads 3 are radially disposed and are brought into engagement with each other upon inward movement of the heads to limit the inward movement which may be imparted to the heads by the fluid pressure cylinders.

In the innermost position of the heads, the concave pipe engaging faces of the heads form a continuous cylinder and the spacing of the heads determining the size to which the bell may be shrunk by the heads.

The semi-circular sections 6 of the ring are connected together at the top of the ring by means of a pivot pin 7 which extends through overlapping knuckles 8 projecting from the ends of the sections. At the free ends of the sections 6 diametrically opposite the pivot 7, the sections are provided with outwardly projecting locking lugs 9 which are adapted to be engaged by a latch member 10 which is provided with a recess 11 on its inner face which fits over the lugs 9 when the ring is in closed position. The latch member 10 swings on a pivot pin 12 fixed to one of the sections 6 and has a projecting arm 13 which is attached to a rod 14 which extends along one side of the ring and passes through apertured lugs 15 on the side of the ring.

The rod 14 has threaded engagement with one of the lugs 15 and has a handwheel 16 attached to its upper end by means of which the rod may be adjusted endwise to swing the latch member 10 toward or away from its locking position. When the sections 6 of the ring are swung together over a pipe, the sections may be rigidly locked against separation by adjusting the latch member 10 into engagement with the lugs 9.

Each of the sections 6 carries an arcuate pipe 17 which extends alongside the cylinders 5 and which communicates with each of the cylinders carried by the section. The pipes 17 extend from adjacent the pivot 7 to adjacent the free ends of the sections 6, the latter ends of the pipes being closed. The ends of the pipes 17 adjacent the pivot 7 are connected to fluid pressure coupling sleeves 18 which are rotatably mounted upon opposite ends of the pivot pin 7. Each of the sleeves 18 has an internal channel 19 which is in communication with the pipe 17 to which the sleeve is connected and with a longitudinal passage 20 in the pivot pin 7 which opens at one end into the channel 19 of one sleeve and at the other end into the channel 19 of the other sleeve. Communication is thus maintained between the two pipes 17 so that fluid pressure may be transmitted across the pivot from one pipe to the other so that all of the cylinders may be simultaneously supplied with fluid under pressure. Fluid under pressure may be supplied to the pipes 17 and through the pipes 17 to the cylinders through a branch pipe 21 connected to one of the pipes 17.

In order to facilitate the positioning of the shrinking unit on a pipe and the removal of the unit from the pipe, means is provided for raising and lowering the ring and for opening and closing the ring so that the ring may be quickly and easily placed in operative position on the pipe or be detached from the pipe and moved to a position clear of the pipe. To this end, means is provided by which the shrinking unit may be suspended from a suitable derrick mounted for movement along the pipe line and by which the shrinking unit may be raised or lowered and opened or closed. Midway between the ends thereof, the pivot pin 7 carries a collar 22 to which is rigidly attached a radially extending rod 23 to the upper end of which is attached a hoist cable 23a. Slidably mounted on the rod 23, there is a collar 24 which is suspended from hoist cables 25 and which is connected by links 26 with lugs 27 on the ring section 6 which are spaced laterally from the pivot 7. When the latch member 10 is released, the free ends of the sections 6 may be swung apart by winding up the cables 25 to suport the weight of the ring from the links 26 so that the ring may be supported in an open position as shown in Fig. 4, so that it may be lifted clear of the pipe. After the ring has been lowered to a position in which the sections 6 are on opposite sides of the pipe, the ring may be closed by winding up the cable 23a to raise the pivot 7 with respect to the lower ends of the links 26 thereby causing the sections to swing together and close upon the pipe. After the sections have been closed, they may be securely locked in closed position by actuating the hand 16 to swing the latch member 10 into engagement with the lugs 9. After the ring has been locked around a pipe and positioned directly over the bell to be shrunk, pressure may be admitted simultaneously to the cylinders 5 to force the pressure applying heads 3 inwardly to shrink the bell into tight engagement with the spigot to form a permanently rigid and tight joint. It is desirable that the pressure applying heads 3 be held in retracted position at all times except when applying pressure to a pipe and this may be accomplished by connecting each of the heads with the sections 6 of the ring which carries the head by means of coil springs 28, which serve to automatically move the heads outwardly to their outermost positions whenever the pressure in the cylinders is released.

The pressure applying heads are preferably actuated by a hydraulic pressure and means is preferably carried by the shrinking unit for developing the hydraulic pressure in the cylinders. As shown in Fig. 1 of the drawing, a pump casing 32 is rigidly connected to one of the ring sections 6 and the branch pipe 21 through which pressure is delivered to the adjacent pipe 17 is connected through a valve casing 33 with pipes 34 and 35 which extend to the pump casing. The pump casing is provided with a liquid reservoir 36 which is adapted to be filled with oil or other liquid suitable for supplying hydraulic pressure to the cylinders and the casing also has therein a pump cylinder 37 from which the liquid is delivered under presure to the pipe 17. The pipe 34 communicates directly with the reservoir 36 through a passage 38 of the casing and the pipe 35 communicates with a valve chamber 39 in the casing. The valve chamber 39 communicates with the pump cylinder 37 through a passage controlled by a check valve 40 and the passage 38 also communicates with the pump cylinder through a passage controlled by a check valve 41. The valve casing 33 has a valve 42 therein which is adapted to be moved into and out of position in which it closes the opening from the casing 33 into the pipe 34. A reciprocating piston 43 is mounted in the cylinder 37 and projects through the top of the casing where it is connected to a hand lever 44 by means of which the piston may be moved up and down in the cylinder 37. When the valve 42 is in closed position, the pressure pipe 21 is cut off from direct communication with the reservoir 36 and is in communication only with the pump cylinder through the pipe 35.

The check valves 40 and 41 are both upwardly opening valves so that when the piston 43 is lifted, the valve 40 will prevent return of liquid to the pump cylinder from the pipe 35 and so that the reduction of pressure in the pump cylinder will cause liquid to be drawn up past the check valve 40 from the passage 38. Upon the down stroke of the piston 43, the check valve 41 is held in closed position by the pressure of the liquid and the check valve 40 is raised to permit the liquid to pass into the pipe 35 and through the casing 33 to the cylinders, so that at each stroke of the piston 43, a portion of the liquid is drawn from the reservoir 36 and forced under pressure into the pipes connected with the cylinders. By operating the hand lever 44, the necessary pressure to shrink the pipe may be quickly developed in the cylinders 5. When the valve 42 is in open position, the pipes 17 and cylinders are in communication directly with the reservoir 36 and operation of the piston 43 will not create pressure in the cylinders.

In some instances, it may be desirable and convenient to operate the hydraulic pressure applying mechanism by means of compressed air. This may be done by means of a pneumatic hydraulic intensifier such as shown in Fig. 5. This intensifier consists of a pneumatic cylinder 45 to which air under pressure may be delivered through a pipe 46 controlled by a valve 47. The cylinder 45 may be mounted directly on one of the sections of the shrinking unit and the pipe 46 may be connected through an air hose to suitable compressor or other source of air under pressure on the carriage from which the shrinking unit is suspended. The cylinder 45 has a piston 48 therein to which is rigidly connected a small elongated piston 49 which operates in a small elongated hydraulic cylinder 50 which is axially alined with the cylinder 45. The cylinder 50 may be directly connected with the branch pipe 21 through which pressure is applied to the cylinders so that when pneumatic pressure is applied to the under side of the relatively large piston 48, a very high pressure may be imparted to the liquid, filling the cylinder 50 and the pipes leading to the cylinders.

In order to prevent the head of one cylinder from lagging behind the head of another, the adjacent heads 3 of each section are preferably connected by dowel pins 51 which are substantially normal to the radii of the inner concave faces of the heads and which have sufficient endwise play in the heads to permit the necessary radial inward movement of the heads.

In Figs. 6 and 7 of the drawings, there is shown a modified form of the invention in which two semi-circular ring sections 52 are connected at their upper ends by a pivot 53 and in which the ring is suspended from a rod 54 attached to the pivot 53 at its lower end and having a hoist cable 55 attached to its upper end. The ring sections 52 tend to move to closed position by gravity when the ring is supported from the pivot 53 and in order to swing the sections apart to permit the ring to be lowered onto a pipe, a link 56 is connected to each of the sections 52 at a point spaced outwardly from the pivot 53 and these links are pivoted at their upper ends to a head 57 which is mounted to slide on the rod 54, the head 57 having hoist cables 58 attached thereto to slide the head 57 upwardly on the rod 54 and swing the sections to open position.

The ring sections 52 have side plates 59, the end portions of which overlap at the bottom of the ring when the sections are in closed position. Rotatably mounted in the side plates of one of the sections, there is an internally threaded sleeve 60 which is supported in the side plates by oppositely threaded pins 61 and 62 which project from the ends of the sleeve into the side plates and are held against rotation by the plates, the pins being moved axially in opposite directions upon rotation of the sleeve. The side plates of the section opposite that carrying the sleeve and pins is provided with apertures which aline with the pins when the sections are in closed position and into which the pins may be projected by rotating the sleeve 60. The sleeve 60 carries a gear 63 which meshes with a pinion 64 on a shaft 65 journaled in the side plates and this shaft has a sprocket 66 attached to one end thereof which receives a sprocket chain 67 which is enclosed in a housing 68 and which extends over a second sprocket 69 to which is attached a hand wheel 70. By turning the hand wheel 70 in one direction, the locking pins 61 and 62 may be simultaneously retracted into the sleeve 60 to free the sections and by turning the handwheel in the opposite direction, the pins may be simultaneously moved out from the opposite ends of the sleeve to lock the sections.

Each of the sections 52 carries a plurality of radially disposed cylinders 71 in which are mounted pistons 72 carrying heads 73 at their inner ends. The heads 73 are each provided with diametrically opposite guide rods 74 which are fixed at their inner ends to the heads and which slide in lugs 76 integral with the cylinders. The pistons 72 are normally held in their outermost positions by springs 77 on the rods 74 which are interposed between the lugs 76 and nuts 78 at the outer edge of the rods. The heads 73 are preferably provided with detachable pipe engaging face plates 73a, detachably connected to the heads and provided with concave pipe engaging faces. The adjacent edges of the heads are radially disposed and are slightly spaced apart when the heads are in their outermost positions. The spaces between the heads being sufficient to permit the heads to move inwardly a sufficient distance to reduce the diameter of the pipe to the desired extent.

In order to operate on pipes of different diameters the face plates 73a may be replaced with other plates having pipe engaging faces formed on a longer or shorter radius.

In order to prevent one head from lagging behind the adjacent heads, the heads are preferably connected by dowel pins 79 substantially normal to the radii of the face plates 73ª which have sufficient endwise play in the heads to permit the radial movement of the heads, but which constrain the heads to simultaneous movement in a radial direction.

Pressure is supplied to the cylinders 71 by means of pipes 80 carried by the sections 52 and connected to each other through the pivot 53 in the same manner as the pipe 17 in the modification previously described. The pipes 80 communicate with the outer ends of each of the cylinders 71 and on one of the sections 52, there is mounted a pump 81 which is connected with one of the pipes 80 and which is adapted to force liquid from a reservoir 82 into the pipes connected to the cylinders.

The pump mechanism is substantially the same as the pump mechanism previously described in connection with Figure 1 and need not be described in detail. The valve controlling the delivery of liquid from the pump to the pipes 80 is in this instance operated by a handwheel 83 and the pump plunger 84 is operated by a lever 85 which is pivoted to the outer end of the plunger and connected by a short link 86 to the pump casing. The lever 85 is similar to the lever 44 previously described except that instead of having an integral handle the lever is provided with a tapered socket 87 at its outer end which is adapted to receive the tapered end of a removable handle 88. The provision of a removable handle is advantageous since it enables the operator to rapidly operate the pump with the short lever until the pipes and cylinders are full of liquid and until the heads 73 have been brought into engagement with the pipe, whereupon the handle 88 is inserted and the heavy pressure required to shrink the pipe may then be quickly applied to the pistons.

In Fig. 8 of the drawings there is shown a further modification of the invention in which the body of the pipe shrinking device is in the form of a saddle 89 which has a semi-cylindrical recess to receive the pipe and which has a centrally disposed fluid pressure cylinder 90 at the top thereof in which is mounted a piston 91 which has attached to its upper end a head 92 which has laterally extending arms 93 upon the outer ends of which are pivotally mounted levers which have long depending arms 94 to the lower ends of which are rigidly attached arcuate pipe engaging members 95. At their upper ends the levers have short upwardly and outwardly extending arms 96 which carry guide sheaves 97 over which extend hoist cables 98 which are attached to lugs 99 on opposite sides of the saddle.

When the weight of the apparatus is supported by the hoist cables inward pressure is exerted on the sheaves 97 tending to swing the arms 96 inwardly and the arms 94 outwardly to swing the pipe engaging members 95 away from the pipe. The lower ends of the pipe engaging members 95 are formed to overlap beneath the bottom of the pipe and are provided with apertures 100 adapted to receive a pivot pin 101. When the pivot pin 101 is removed and the apparatus is supported by the hoist cables 98 the pipe engaging members 95 are held in the positions indicated by the dotted lines in Fig. 8 so that the saddle can be lowered onto a pipe joint to be shrunk. As soon as the cables 98 are relieved of the weight of the saddle by the engagement of the saddle with the pipe, the pipe engaging members 95 swing by gravity into engagement with the under side of the pipe, bringing the apertures 100 into registry so that the sections may be secured together by the pivot pin 101.

Pressure is applied to the pipe by means of fluid under pressure in the cylinder 90 which lifts the piston 91 and head 92 pulling the members 95 toward the saddle 89. The piston 91 is preferably subjected to hydraulic pressure, liquid being admitted to the cyliner 90 from a reservoir 102 surrounding the cylinder through a short conduit 103 which has a check valve 104 therein which permits liquid to flow by gravity from the reservoir 102 into the cylinder 90, but which is held in closed position by reverse pressure preventing flow of liquid in the reverse direction when pressure is applied to the liquid in the cylinder. Hydraulic pressure is created in the cylinder 90 by means of a pneumatic cylinder 105 directly over the cylinder 90 in the head 92. The cylinder 105 has a piston 106 to which is attached a plunger 107 of relatively small diameter as compared to the piston 106, which extends through the bottom of the cylinder 105 and through the top of the piston 91 into a pressure developing chamber 108 formed in the piston 91. The piston 106 also has attached thereto an upwardly extending rod 109 which extends upwardly through the head of the cylinder and upon which is mounted a spring 110 which serves to normally hold the piston 106 in its uppermost position, the spring 110 being mounted between the head of the cylinder and a nut 111 at the upper end of the rod 109. The piston 106 and plunger 107 are normally held in the position shown in Fig. 8 by the spring 110 and pressure may be admitted to the top of the cylinder 105 through a pressure pipe 112 to force the piston 106 and plunger 107 downwardly and, as the plunger 107 is moved downwardly in the chamber 108, it tends to reduce volumetric capacity of the pressure chamber beneath the piston 91 and the liquid in the chamber is subjected to a heavy pressure which raises the piston 91 and head 92 and draws the pipe engaging members 95 upwardly toward the saddle 89 shrinking the pipe.

It will be apparent that the present invention provides a very convenient and simple device for forming a permanent connection between a bell and spigot and a pipe line and that a minimum of manual labor is required in applying the shrinking device to the joints and in moving the device from joint to joint along a pipe line.

Furthermore, it is to be understood that the particular form of apparatus shown and described, and the particular procedure set forth, are presented for purposes of explanation and illustration and that various modifications of said apparatus and procedure can be made without departing from our invention as defined in the appended claims.

What we claim is:

1. Apparatus of the character described comprising a ring composed of two substantially semi-circular sections, a pivot connecting an end of one section to an end of the other, a plurality of fluid pressure cylinders carried by each section, radially disposed pistons in said cylinders each having laterally elongated work engaging heads at their inner ends, means for supplying fluid under pressure to said cylinders, hoisting means connected to said ring for swinging the sections to open position free of the work, and releasable locking means for securing the free ends of the sections together.

2. Apparatus of the character described comprising a ring composed of two substantially semi-circular sections, fluid pressure conduits carried by said sections, means pivotally connecting said sections and said conduits end to end, a series of fluid pressure cylinders carried by said sections, and communicating with said fluid pressure conduits, radially disposed pistons in said cylinders having work engaging heads at their inner ends, and releasable locking means for securing the free ends of said sections together.

3. Apparatus of the character described comprising a ring composed of two substantially semi-circular sections, fluid pressure conduits carried by said sections, means pivotally connecting said sections and said conduits end to end, a series of fluid pressure cylinders carried by said sections, and communicating with said fluid pressure conduits, radially disposed pistons in said cylinders having work engaging heads at their inner ends, releasable locking means for securing the free ends of said sections together, and means for hoisting said ring and for swinging said sections apart.

4. Apparatus of the character described comprising a ring composed of arcuate sections pivotally connected end to end, releasable locking means for securing an end of one section to the abutting end of another section when the ring is closed, a series of fluid pressure cylinders carried by said ring, said cylinders having radially disposed pistons provided with concave work engaging heads at their inner ends, means for simultaneously supplying pressure to and relieving the pressure in said cylinders, and hoisting means connected to said ring diametrically opposite said locking means for lifting the ring clear of the work after release of the locking means.

5. Apparatus of the character described comprising a ring composed of arcuate sections pivotally connected end to end, releasable locking means for securing an end of one section to the abutting end of another section when the ring is closed, a series of fluid pressure cylinders carried by said ring, said cylinders having radially disposed pistons provided with concave work engaging heads at their inner ends, a liquid reservoir carried by said ring, and means for pumping liquid from said reservoir simultaneously into said cylinders.

6. Apparatus of the character described comprising a ring composed of arcuate sections pivotally connected end to end, releasable locking means for securing an end of one section to the abutting end of another section when the ring is closed, a series of fluid pressure cylinders carried by said ring, said cylinders having radially disposed pistons provided with concave work engaging heads at their inner ends, means for simultaneously supplying pressure to and relieving the pressure in said cylinders, and means for automatically retracting said pistons when the pressure in the cylinders is relieved.

7. Apparatus of the character described comprising a ring composed of arcuate sections pivotally connected end to end, releasable locking means for securing an end of one section to the abutting end of another section when the ring is closed, a series of fluid pressure cylinders carried by said ring, said cylinders having radially disposed pistons provided with concave work engaging heads at their inner ends, means for simultaneously supplying pressure to and relieving the pressure in said cylinders, and means operable upon release of said locking means for opening said ring and lifting the same clear of the work.

8. Apparatus of the character described comprising a ring composed of two substantially semi-circular sections, a pivotal connection between an end of one section and an end of the other, releasable locking means for securing the free ends of the sections together, fluid pressure cylinders carried by said ring, radially disposed pistons in said cylinders, heads having concave work engaging faces carried by the inner ends of the pistons, a conduit on each section in communication with the cylinders carried thereby, means for maintaining communication between said conduits across said pivotal connection, and means for supplying fluid under pressure to one of said conduits.

9. Apparatus of the character described comprising a ring composed of two substantially semi-circular sections, a pivotal connection between an end of one section and an end of the other, releasable locking means for securing the free ends of the sections together, fluid pressure cylinders carried by said ring, radially disposed pistons in said cylinders, heads having concave work engaging faces carried by the inner ends of the pistons, means for simultaneously supplying pressure to and relieving the pressure in said cylinders, and springs carried by the sections for simultaneously retracting the pistons when the pressure in the cylinders is relieved.

10. Apparatus of the character described comprising a ring composed of two substantially semi-circular sections, a pivotal connection between an end of one section and an end of the other, releasable locking means for securing the free ends of the sections together, fluid pressure cylinders carried by said ring, radially disposed pistons in said cylinders, heads having concave work engaging faces carried by the inner ends of the pistons, means for simultaneously supplying pressure to and relieving the pressure in said cylinders, and springs acting on said pistons to retract the same when the pressure in the cylinders is relieved.

11. Apparatus of the character described comprising a ring composed of two substantially semi-circular sections, a pivot connecting an end of one section to an end of the other, releasable locking means for securing the free ends of the sections together, a plurality of radially movable heads carried by each section, means for simultaneously moving said heads inwardly to apply pressure to a pipe, and means for swinging said sections apart and for lifting the ring.

12. Apparatus of the character described comprising a ring adapted to encircle a pipe composed of two substantially semi-circular sections, a pivot connecting an end of one section to an end of the other, releasable locking means for securing the free ends of the sections together, a plurality of radially movable heads carried by each section, means for simultaneously moving said heads inwardly to apply pressure to a pipe, and hoisting means connected to said sections on opposite sides of said pivot to open the ring and hoist the same clear of the work.

13. Apparatus of the character described comprising a ring adapted to encircle a pipe composed of two substantially semi-circular sections, a pivot connecting an end of one section to an end of the other, releasable lock-means for securing the free ends of the sections together, a plurality of radially movable heads carried by each section, means for simultaneously moving said heads inwardly to apply pressure to the work hoisting means connected to said pivot, and separate hoisting means connected to said sections at points spaced from said pivot.

14. Apparatus of the character described comprising a ring composed of two substantially semi-circular sections, a pivot connecting an end of one section to an end of the other, releasable locking means for securing the free ends of the sections together, a plurality of radially movable heads carried by each section, means for simultaneously moving said heads inwardly to apply pressure to the work, a rod attached to said pivot and extending radially therefrom, a member slidable on said rod, hoisting means connected to said member, and links connecting said member with said sections at points spaced from said pivot.

15. Apparatus of the character described comprising a ring composed of two substantially semi-circular detachably connected sections, a plurality of fluid pressure cylinders mounted on each of said sections, radially disposed pistons in said cylinders, heads having concave work engaging faces carried by the inner ends of the pistons, means for simultaneously applying pressure to and relieving the pressure in said cylinders, and springs acting on said pistons to retract the same when the pressure in the cylinders is relieved.

16. Apparatus of the character described comprising a ring composed of two substantially semi-circular detachably connected sections, a plurality of fluid pressure cylinders mounted on each of said sections, radially disposed pistons in said cylinders, heads having concave work engaging faces carried by the inner ends of the pistons, means for supplying pressure to said cylinders to actuate said heads, and interengaging means carried by adjacent heads for constraining said heads to simultaneous radial movements.

17. Apparatus of the character described comprising a ring composed of two substantially semi-circular detachably connected sections, a plurality of fluid pressure cylinders mounted on each of said sections, radially disposed pistons in said cylinders, heads having concave work engaging faces carried by the inner ends of the pistons, means for supplying pressure to said cylinders to actuate said heads, and means connecting adjacent heads for simultaneous radial movement.

18. Apparatus of the character described comprising a ring composed of two substantially semi-circular detachably connected sections, a plurality of fluid-pressure cylinders mounted on each of said sections, radially disposed pistons in said cylinders, heads having concave work engaging faces carried by the inner ends of the pistons, means for supplying pressure to said cylinders to actuate said heads, and hoisting means connected to said ring on opposite sides of a joint connecting said sections.

In testimony whereof we affix our signatures.

FRANK H. SMITH.
HENRY A. STRINGFELLOW.